Patented Dec. 14, 1948

2,456,380

UNITED STATES PATENT OFFICE 2,456,380

CATALYTIC OXIDATION OF NICOTINE

Francis E. Cislak, Indianapolis, Ind., and William R. Wheeler, Cincinnati, Ohio, assignors to Reilly Tar & Chemical Corporation, Indianapolis, Ind., a corporation of Indiana No Drawing. Original application May 31, 1941, Serial No. 396,175. Divided and this application August 14, 1947, Serial No. 768,706

9 Claims. (Cl. 260—296)

Our invention relates to the catalytic oxidation of nicotine, to produce nicotinonitrile and by conversion thereof to produce nicotinic acid. This application is a division of our co-pending application Serial No. 396,175, filed May 31, 1941.

It is known that certain substituted pyridine bases in which the substituent and the pyridine nucleus are linked through a carbon-carbon bond may be oxidized in the liquid phase by oxidizing agents such as potassium permanganate to form pyridinecarboxylic acids. For instance, nicotine can be so oxidized to nicotinic acid in liquid phase.

We have now found it possible to oxidize nicotine in vapor phase to form nicotinonitrile instead of the nicotinic acid which is formed by liquid phase oxidation, by catalytic partial oxidation with a mildly oxidizing oxygen-containing gas, such for instance as air, mixed steam and air, or mixed carbon dioxide and oxygen.

In many cases nicotinonitrile will be the desired product, but is readily transformed to nicotinic acid by heating with a mineral acid.

Oxidation catalysts which have been found effective are the oxides of the elements of the A subgroups of Groups V and VI of the periodic system, either singly or mixed one with another. The catalytic effectiveness of these oxides may be varied by the addition of other oxides, such for instance as oxides of iron, nickel, manganese, or chromium.

We prefer to carry out our invention in continuous process. In so doing, we mix the nicotine with the mildly oxidizing oxygen-containing gas, desirably air, and pass the resultant mixture over the oxidation catalyst, while maintaining suitable oxidation temperature. Any suitable apparatus for doing this may be used.

The mixture that is passed over the oxidation catalyst desirably contains a great excess of air (or other mildly oxidizing oxygen-containing gas)—preferably several times as much as is necessary for the oxidation. The temperature is an elevated temperature, in comparison with room temperature; but varies with the nature of the catalyst and the nature of the substituted pyridine base to be oxidized, and is controlled to give the desired partial oxidation and to prevent total combustion. This temperature is usually in the range between 250° and 500° C.; but the optimum temperature must be determined in each case by analysis of the product, and the temperature lowered if much carbon dioxide appears and raised if neither carbon dioxide nor the desired partial-oxidation product appears.

We have found one excellent catalyst to be a vanadium pentoxide catalyst prepared as follows:

A hot aqueous suspension of ammonium vanadate is sprayed on to small granules of silica, desirably between sand-grain size and pea size, which are heated well above 100° C. After the spraying, the coated granules are calcined in air at about 400° C. for several hours.

These coated and calcined granules are placed in steel tubes in which the oxidation reaction is to take place, and the oxygen-containing gas is passed through such steel tubes.

Example 1

We vaporize nicotine, mix it with 30 to 60 times its weight of air, and heat the mixture to about 450° C. This hot mixture of nicotine and air is passed over the vanadium pentoxide catalyst described previously, at a space velocity of about 4000, with the catalyst and the mixture of gases maintained at about 450° C. in any suitable manner. (By space velocity we mean the total volume of gas, measured at standard temperature and pressure, which passes through the tube per hour, divided by the volume of the catalyst.) Partial oxidation of the nicotine takes place, to produce nicotinonitrile (3-pyridinecyanide). This may be recovered by cooling, to condense the nicotinonitrile, and/or by scrubbing the gases, as with water, to take up the nicotinonitrile. This nicotinonitrile is readily transformed into nicotinic acid by heating with a mineral acid, such as hydrochloric acid or sulfuric acid.

Example 2

In the foregoing Example 1, we may vary the catalysts. For instance, we may use a vanadium-iron catalyst; which is conveniently prepared by mixing an aqueous solution of ferric nitrate with an aqueous solution of vanadyl nitrate, in approximate molar proportions of about 1 to 24, and spraying it on to small inert granules, conveniently of silica, maintained at above 100° C.; and then calcining the sprayed granules in air, at about 400° C., for several hours.

We find that this vanadium-iron catalyst is rather more stable than the simple vanadium catalyst first referred to, in that it has less tendency to deteriorate in use.

Instead of a vanadium or vanadium-iron catalyst we may use a molybdenum catalyst or a chromium catalyst or a tungsten catalyst, prepared in the same general way as the vanadium catalysts; or may use other composite catalysts, such as vanadium-chromium, vanadium-molybdenum, chromium-tungsten, etc. In all these instances the actual catalysts will be the oxides of the metals named.

We claim:

1. The process of producing nicotinonitrile, which consists in subjecting nicotine to partial oxidation in vapor phase with a mildly oxidizing oxygen-containing gas at elevated temperature in comparison with room temperature and in the presence of an oxidation catalyst essentially comprising an oxide of an element of the A sub-groups of groups V and VI of the periodic system.

2. The process of producing nicotinonitrile, which consists in subjecting nicotine to partial oxidation in vapor phase with air at elevated temperature in comparison with room temperature and in the presence of an oxidation catalyst essentially comprising an oxide of an element of the A sub-groups of groups V and VI of the periodic system.

3. A process for the preparation of nicotinonitrile by vapor-phase reaction of nicotine with gases containing free oxygen in the presence of catalytic agents.

4. A process for the vapor-phase catalytic conversion of nicotine to nicotinonitrile by reaction with oxygen in admixture with other substantially inert gases.

5. A process of the vapor-phase oxidation of nicotine to nicotinonitrile with air in the presence of catalytic oxides.

6. A process for the vapor-phase oxidation of nicotine to nicotinonitrile with air in the presence of vanadium oxide.

7. A process for the vapor-phase oxidation of nicotine to nicotinonitrile with air in the presence of molybdenum oxide.

8. A process for the vapor-phase oxidation of nicotine to nicotinonitrile with air in the presence of an oxide mixture of molybdenum oxide-vanadium oxide.

9. A process for the vapor-phase oxidation of nicotine to nicotinonitrile with air in the presence of catalysts at bath temperatures of about 300°-500° C.

FRANCIS E. CISLAK.
WILLIAM R. WHEELER.

REFERENCES CITED

The following references are of record in the file of this patent:

Maier, "Das Pyridine und seiner Derivatives," p. 222 (1934).